(12) United States Patent
Endo et al.

(10) Patent No.: US 7,580,770 B2
(45) Date of Patent: Aug. 25, 2009

(54) NUMERICAL CONTROLLER

(75) Inventors: Takahiko Endo, Kokubunji (JP); Yasushi Takeuchi, Hino (JP)

(73) Assignee: Fanuc Ltd, Yamanashi (JP)

( * ) Notice: Subject to any disclaimer, the term of this patent is extended or adjusted under 35 U.S.C. 154(b) by 126 days.

(21) Appl. No.: 11/395,268

(22) Filed: Apr. 3, 2006

(65) Prior Publication Data
US 2006/0235565 A1    Oct. 19, 2006

(30) Foreign Application Priority Data

Apr. 13, 2005  (JP) .............................. 2005-116214
Apr. 25, 2005  (JP) .............................. 2005-126813

(51) Int. Cl.
*G06F 19/00* (2006.01)
(52) U.S. Cl. ................... 700/186; 700/190; 700/191; 700/192
(58) Field of Classification Search ......... 700/186–188, 700/159, 160, 184, 190, 193, 170, 191, 192
See application file for complete search history.

(56) References Cited

U.S. PATENT DOCUMENTS

| | | | | |
|---|---|---|---|---|
| 5,191,538 | A | * | 3/1993 | Yoneda et al. .............. 700/180 |
| 5,848,859 | A | | 12/1998 | Clark |
| 5,926,389 | A | * | 7/1999 | Trounson .................... 700/187 |
| 6,856,854 | B2 | * | 2/2005 | Endo et al. .................. 700/186 |
| 6,885,909 | B2 | | 4/2005 | Isohata |
| 2003/0187542 | A1 | * | 10/2003 | Endo et al. .................. 700/186 |
| 2003/0191553 | A1 | * | 10/2003 | Isohata ....................... 700/170 |
| 2004/0128816 | A1 | | 7/2004 | Watanabe et al. |

FOREIGN PATENT DOCUMENTS

| | | |
|---|---|---|
| JP | 59-177604 | 10/1984 |
| JP | 62-79504 | 4/1987 |
| JP | 6-15547 | 1/1994 |
| JP | 2001-306150 | 11/2001 |
| JP | 2002-283205 | 3/2002 |
| JP | 2003-303005 | 10/2003 |
| WO | WO 2005/111745 | 11/2005 |

OTHER PUBLICATIONS

Extended European Search Report, dated Sep. 19, 2006, and issued in related European Patent Application No. 06251564.8—2206.

(Continued)

*Primary Examiner*—Charles R Kasenge
(74) *Attorney, Agent, or Firm*—Staas & Halsey LLP

(57) ABSTRACT

A path table operation is performed while updating the reference positions. When a read-out command in the path cycle table is read out, the reference positions are withdrawn and reset, and the respective axial positions at the time of the initiation of the path cycle command are stored. From the next period, the target positions are determined by adding the positions at the time of initiation to the respective axial positions corresponding to the reference positions stored in the path cycle table, and a path table operation is performed. A single path cycle table is sufficient for storing commands for portions to be repeatedly worked.

1 Claim, 12 Drawing Sheets

OTHER PUBLICATIONS

Lipatov, A. N., "Deep Drilling on Machine Tools With Numerical Control", Soviet Engineering Research, Pra, Melton Mowbray, GB, vol. 11, No. 5, Jan. 1991, pp. 154-157.

Zhiming, G., et al., "Development of PC-based adaptive CNC control system", SIMTECT Technical Report, XX, XX, 2001, pp. 1-8.

Communication from the Japanese Patent Office mailed on Jan. 22, 2008.

Communication from the Japanese Patent Office mailed on Jul. 1, 2008 in the related Japanese Patent Application No. 2005-126813.

* cited by examiner

FIG. 3A

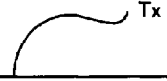

| REFERENCE POSITION | COMMAND POSITION (X) | CYCLE CALL-UP |
|---|---|---|
| L0 | X0: FINISHING CYCLE START POSITION 0 | |
| L1 | X1: FIRST-TIME CUT-IN POSITION A | Q1000 |
| L2 | X2: SECOND-TIME CUT-IN POSITION B | Q1000 |
| L3 | X3: THIRD-TIME CUT-IN POSITION C | Q1000 |
| L4 | X0: FINISHING CYCLE START POSITION 0 | |

FIG. 3B

| REFERENCE POSITION | COMMAND POSITION (Z) | CYCLE CALL-UP |
|---|---|---|
| L0 | Z0: FINISHING CYCLE START POSITION 0 | |
| L1 | Z1: FIRST-TIME CUT-IN POSITION A | Q1010 |
| L2 | Z2: SECOND-TIME CUT-IN POSITION B | Q1010 |
| L3 | Z3: THIRD-TIME CUT-IN POSITION C | Q1010 |
| L4 | Z0: FINISHING CYCLE START POSITION 0 | |

FIG. 4A

Txs (Q1000)

| REFERENCE POSITION | COMMAND POSITION (X) |
|---|---|
| L11 | X11: FINISHING CYCLE POSITION A1 |
| L12 | X12: FINISHING CYCLE POSITION A2 |
| L13 | X13: FINISHING CYCLE POSITION A3 |
| L14 | X14: FINISHING CYCLE POSITION A4 |
| L15 | X15: FINISHING CYCLE START POSITION A |

FIG. 4B

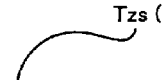

Tzs (Q1010)

| REFERENCE POSITION | COMMAND POSITION (Z) |
|---|---|
| L11 | Z11: FINISHING CYCLE POSITION A1 |
| L12 | Z12: FINISHING CYCLE POSITION A2 |
| L13 | Z13: FINISHING CYCLE POSITION A3 |
| L14 | Z14: FINISHING CYCLE POSITION A4 |
| L15 | Z15: FINISHING CYCLE START POSITION A |

| REFERENCE POSITION | COMMAND POSITION (X) | CYCLE CALL-UP |
|---|---|---|
| L0 | X0: DRILL CYCLE START POSITION A | |
| L1 | X1: FIRST-TIME START POSITION B | Q1020 |
| L4 | X4: SECOND-TIME START POSITION C | Q1020 |
| ⋮ | ⋮ | ⋮ |

| REFERENCE POSITION | COMMAND POSITION (Z) | CYCLE CALL-UP |
|---|---|---|
| L0 | Z0: DRILL CYCLE START POSITION A | |
| L1 | Z1: FIRST-TIME START POSITION B | Q1030 |
| L2 | Z2: INTERMEDIATE POSITION B1 | |
| L3 | Z3: INTERMEDIATE POSITION B2 | |
| L4 | Z4: SECOND-TIME START POSITION C | Q1030 |
| ⋮ | ⋮ | ⋮ |

| REFERENCE POSITION | COMMAND POSITION (X) |
|---|---|
| L15 | 0: DRILL CYCLE START POSITION B |

Txs (Q1020)

| REFERENCE POSITION | COMMAND POSITION (Z) |
|---|---|
| L11 | Z11: DRILL CYCLE OPERATION POSITION |
| L12 | Z12: DRILL CYCLE OPERATION POSITION |
| L13 | Z13: DRILL CYCLE OPERATION POSITION |
| L14 | Z14: DRILL CYCLE OPERATION POSITION |
| L15 | Z15: DRILL CYCLE OPERATION POSITION B |

Tzs (Q1030)

Txc

| TIME | POSITION |
|---|---|
| L0 | X0 |
| L1 | X1 |
| L2 | X2 |
| L3 | X3 |
| L4 | SCREW CUTTING WORKING "END" COMMAND |
| L5 | X3 |

Txs, Tzs

| SPINDLE POSITION | POSITION |
|---|---|
| S0 | U0 (x0, z0) |
| S1 | U1 (x1, z1) |
| S2 | U2 (x2, z2) |
| S3 | U3 (x3, z3) |
| S4 | U4 (x4, z4) |
| S5 | SCREW CUTTING CYCLE "END" COMMAND |

(U1/U2/U3/U4: INCREMENTAL COMMANDS)

NUMERICAL CONTROLLER

BACKGROUND OF THE INVENTION

1. Field of the Invention

The present invention relates to a numerical controller which controls a machine tool. More particularly, the present invention relates to a numerical controller which has the function of controlling the driving of respective axes on the basis of data that is stored in a tabular format.

2. Description of the Related Art

Numerical controllers in which free tool operations that could not be achieved using commands based on conventional blocks are made possible by storing amounts of movement and positions on respective axes in memory beforehand in a tabular format, and controlling the driving of the respective axes on the basis of this data stored in memory (instead of using commands based on blocks of an NC program), so that a shortening of the working time and increased precision of working can be realized, are already universally known.

For example, a technique is known which is devised so that the positions on movable axes for respective times or respective rotational angles are stored in memory as numerical control data, the time or rotational angle is monitored, and numerical control data corresponding to the movable axes is output each time that a stored time or rotational angle is reached (Japanese Patent Application Laid-Open No. S59-177604).

Furthermore, a technique is also known in which a data table that stores command positions on the X axis and Z axis with respect to reference positions is provided, the reference positions are determined by applying an override value to the value of a counter that counts reference pulses, and the X axis and Z axis are synchronously controlled by outputting command positions on the X axis and Z axis stored in the data table on the basis of these reference positions, so that an override is applied even in case where driving control is performed by means of data stored in the data table; moreover, this technique is devised so that command positions can be connected linearly, or with a two- or three-dimensional function or the like, and furthermore auxiliary functions can also be commanded (see Japanese Patent Application Laid-Open No. 2003-303005).

Furthermore, an invention is also known which is devised so that movement commands are output on the basis of a table that stores amounts of movement of the respective axes for each fixed period of time, or movement times for each fixed amount of movement (see Japanese Patent Application Laid-Open No. H6-15547).

In working that is performed in machine tool, there may be cases in which an operation of the same pattern is repeatedly executed in turning finishing cycle working, drill cycle working and the like. If an attempt is made to perform such working in which the same working is repeated using conventional tabular format data, the amount of tabular format data is greatly increased. Since the storage of tabular format data in memory involves the storage of positional data for respective axes in a tabular format using reference times or spindle positions as reference positions, the reference positions differ during each working process even in case where the same working is repeatedly performed, so that the respective axial positions must be stored as data for these reference positions. Consequently, the amount of data is greatly increased, so that the required capacity of the storage means used to store this data is also increased.

SUMMARY OF THE INVENTION

The present invention relates to a numerical controller which has the function of driving respective axes by commanding respective axial positions with respect to reference positions in which time or spindle position is used as reference, as data in a tabular format.

A first configuration of this numerical controller comprises: storage means which has main tabular format data that stores respective axial positions with respect to the reference positions, and a path cycle table which stores, as tabular format data, respective axial positions with respect to the reference positions, from the working start position to the working end position of the same working that is repeatedly performed; and driving means which obtains commands for the respective axes and performs driving on the basis of the main tabular format data, and when the path cycle table is called up on the basis of the reference positions, outputs amounts of movement of the respective axes to respective axial motors and performs driving on the basis of the respective axial positions at the reference positions at the time at which the table is called up, and the data stored in the path cycle table.

The respective reference positions may be stored in the path cycle table as absolute positions, with the start position of repeatedly performed working taken as 0, and when the path cycle table is called up and driving is executed, the driving means outputs amounts of movement of the respective axes to the respective-axial motors and performs driving on the basis of the data stored in the path cycle table, with the reference positions at the time that the path cycle table is called up taken as 0.

The respective reference positions are successively stored in the path cycle table as incremental values, and when the path cycle table is called up and driving is executed, the driving means outputs amounts of movement of the respective axes to the respective axial motors and performs driving on the basis of the data stored in the path cycle table, with the reference positions at the time that the path cycle table is called up taken as 0.

A second configuration of the numerical controller of the present invention comprises: storage means which has main tabular format data that stores respective axial positions with respect to the reference positions, and a path cycle table which stores, as tabular format data, respective axial positions with respect to the reference positions, from the working start position to the working end position of the same working that is repeatedly performed; first calculating means which calculates the amounts of movement of the respective axes on the basis of the main tabular format data; second calculating means which calculates the amounts of movement of the respective axes on the basis of the data in the path cycle table; and driving means which adds the amounts of movement of the respective axes for the respective operations calculated by the first and second calculating means, outputs the results to respective axial motors, and performs driving.

The reference positions of the main tabular format data that stores the respective axial positions may be data using time as a reference, and the reference positions of the path cycle table may be data using positions on the spindle axis as a reference.

The first and second configurations of the numerical controller of the present invention may adopt the following aspects.

The positions on the respective axes stored in the abovementioned path cycle table are stored as absolute positions, with the start position of repeatedly performed working taken as 0.

The positions on the respective axes stored in the abovementioned path cycle table are successively stored as incremental values.

The abovementioned working is cutting, the abovementioned main tabular format data is data relating to the cut-in operation, the data stored in the abovementioned path cycle table is data relating to the working cycle, and cutting is completed when the operation of the working cycle is completed following the completion of the cut-in operation.

The abovementioned working is cutting, the abovementioned main tabular format data is data relating to the cut-in operation, the data stored in the abovementioned path cycle table is data relating to the working cycle, and cutting is completed after again repeating the operation of the working cycle a specified number of times in a final cut-in amount following the completion of the cut-in operation.

The abovementioned working is screw cutting, the main tabular format data is data relating to the cut-in operation, and the data stored in the path cycle table is data relating to the screw cutting cycle.

In the present invention, machine tool is operated using tabular format data, and when working which includes working that is executed repeatedly is performed, working in which the amount of such data is reduced can be accomplished.

BRIEF DESCRIPTION OF THE DRAWINGS

FIGS. 3A and 3B are explanatory diagrams of one example of a path table used for the turning finishing cycle working shown in FIG. 2;

FIGS. 4A and 4B are explanatory diagrams of one example of a path cycle table used for the turning finishing cycle working shown in FIG. 2;

DESCRIPTION OF THE PREFERRED EMBODIMENTS

Figure 1:
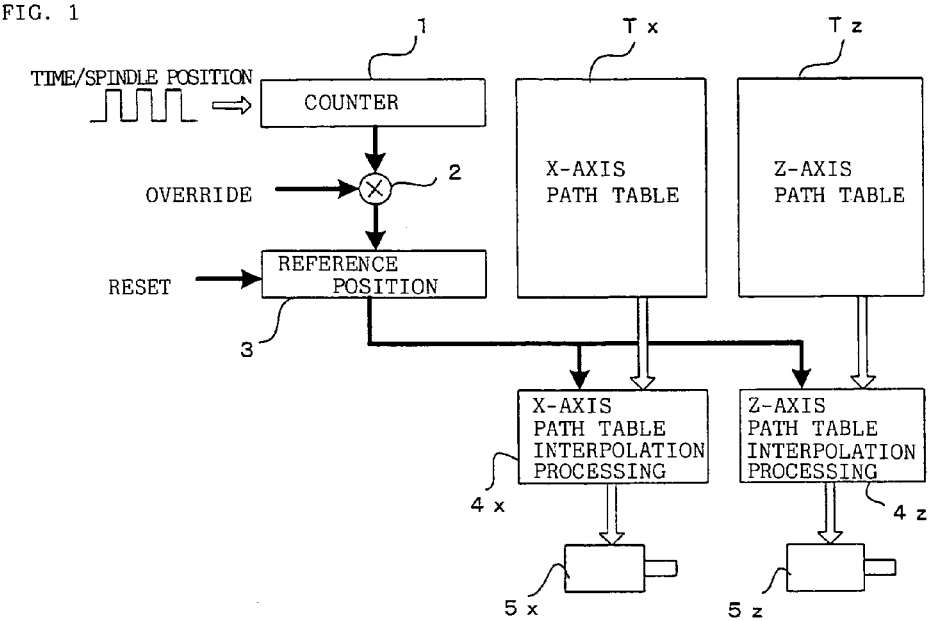
FIG. 1 is a schematic diagram of a path table operation which is performed by a first embodiment of the numerical controller of the present invention.

FIG. 1 is a schematic diagram of an operation using tabular format data (hereafter referred to as a "path table operation") in a first embodiment of the present invention.

Figures 17, 18:
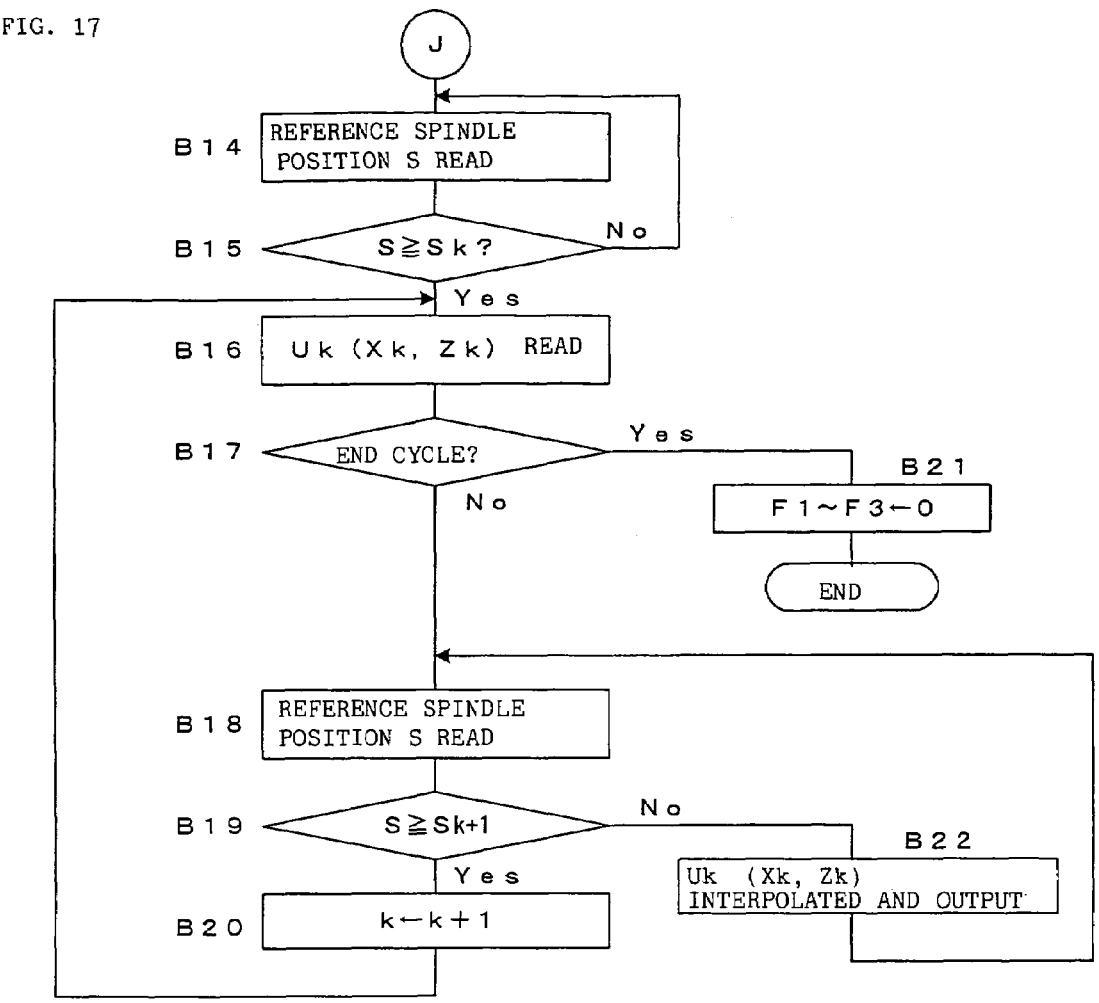
FIG. 17 is a continuation of the flow chart shown in FIG. 16.
FIG. 18 is an explanatory diagram of an example of the path table used in an ordinary path table operation.

In this embodiment, an X-axis path table Tx and a Z-axis path table Tz are provided. In these path tables, positions on respective axes corresponding to reference positions are stored. One conventional example (example of an X-axis path table) is shown in FIG. 18. The X-axis positions Xa through Xe are stored in correspondence with the reference positions La through Le. Similarly, Z-axis positions are also stored in the Z-axis path table Tz in correspondence with reference positions.

Spindle positions (or command positions) based on pulses from a position detector attached to the spindle, or reference pulses (using time as a reference) from an external pulse generator, are input into and counted by a counter 1. The count value of this counter 1 is multiplied in a multiplier 2 by a multiplication factor set in override means, and the result is stored in a reference position counter 3. This reference position counter 3 is reset at the point in time at which path table operation is commanded. The value of the reference position counter 3 is input into X- and Z-axis path table interpolation processing parts 4x and 4z as a reference position. In the X- and Z-axis path table interpolation processing parts 4x and 4z, the X- and Z-axis command positions with respect to the reference positions are determined with reference to the X-axis path table Tx and Z-axis path table Tz. Then, the amounts of movement in the processing period are determined from these determined command positions, and these amounts of movement are output to the respective control axial motors 5x and 5z as command values, so that synchronous operation along the X and Z axes is performed in accordance with the reference positions.

Figure 19:
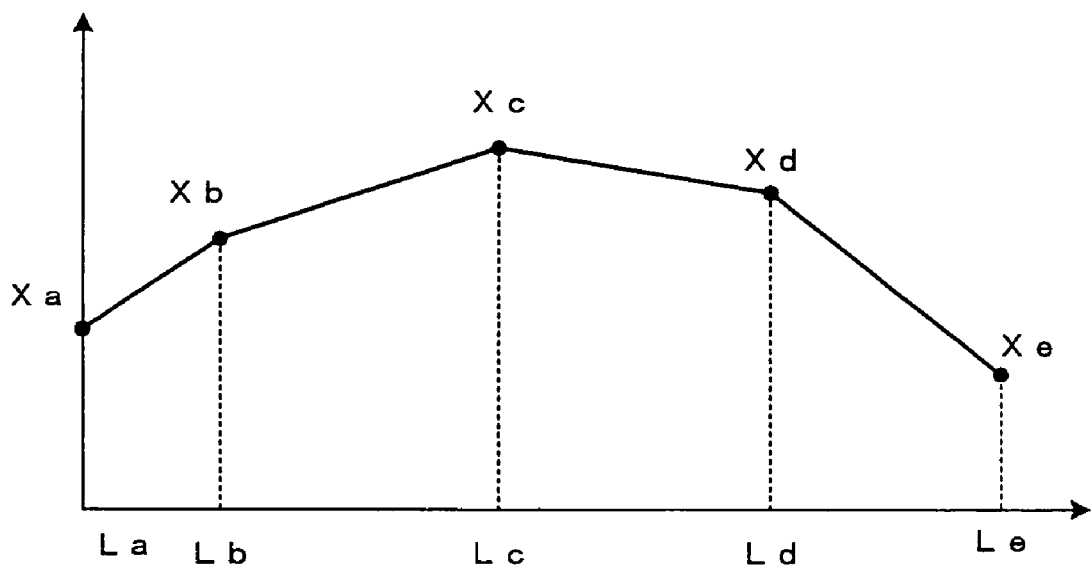
FIG. 19 is an explanatory diagram of operation on the X axis using the path table shown in FIG. 10.
Figure 6:
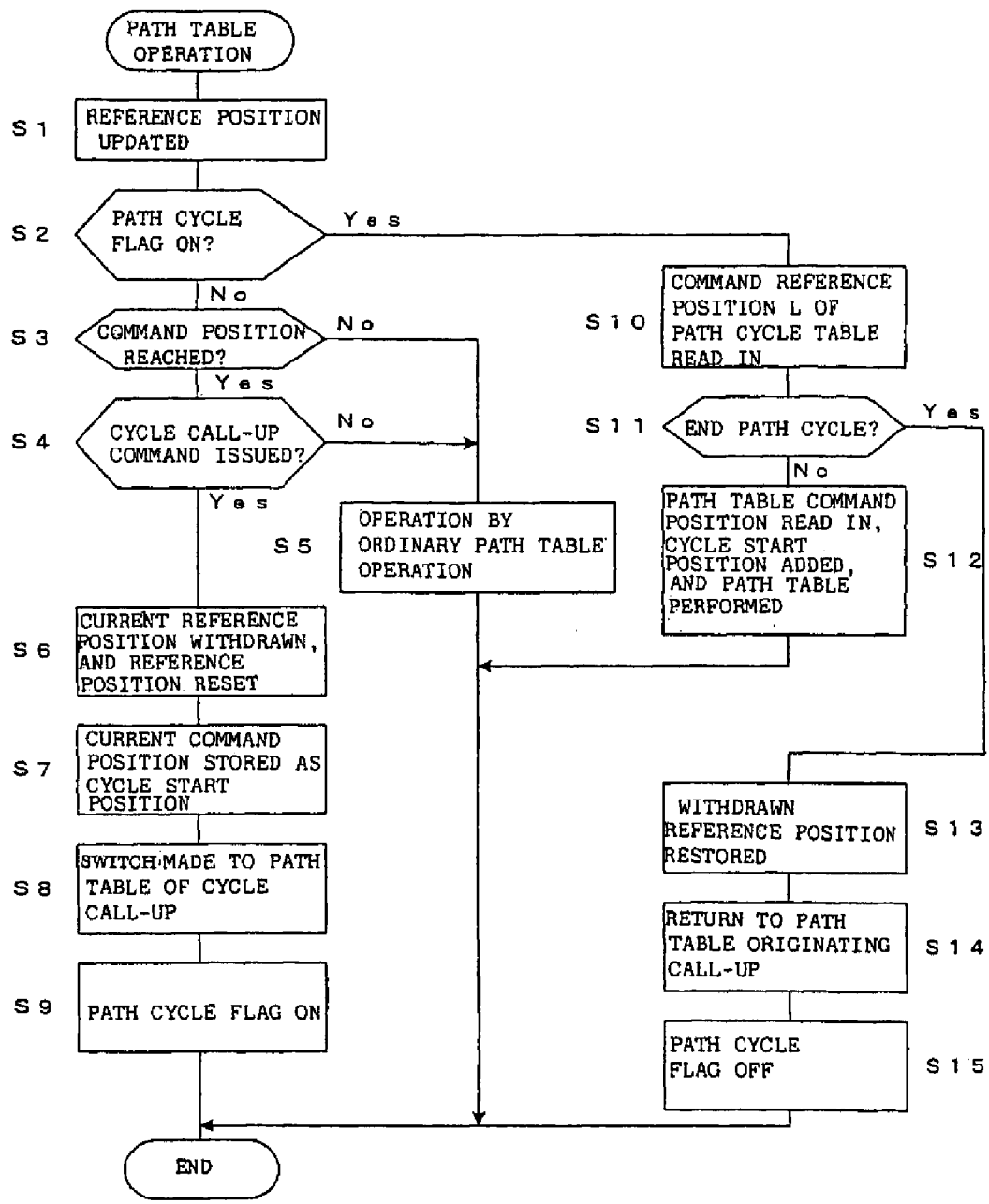
Figures 11, 12, 13:
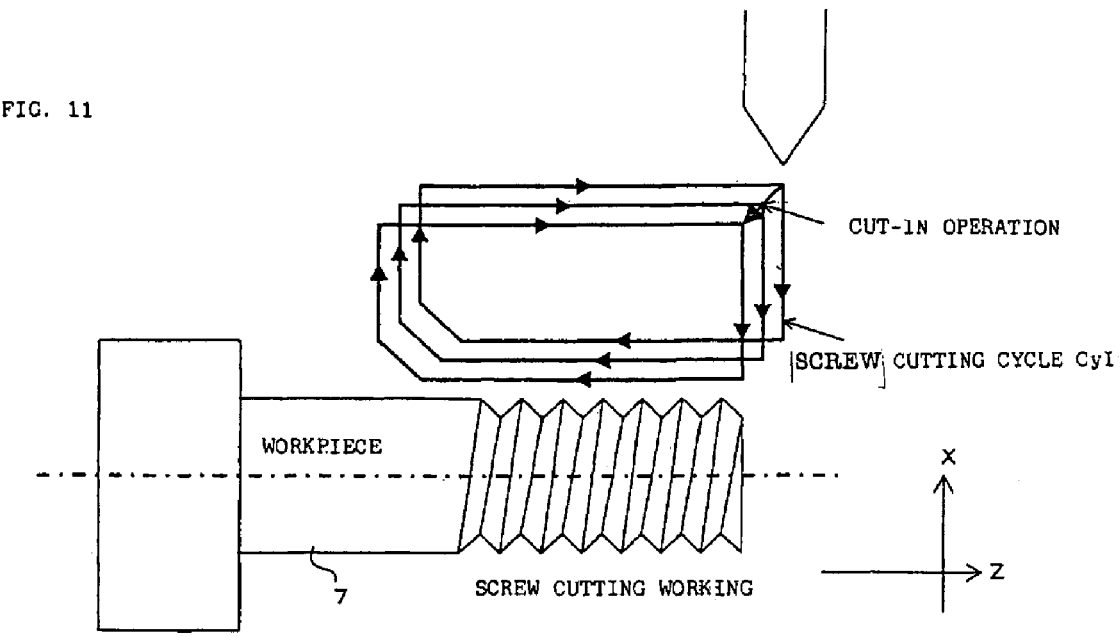

FIG. 19 is a graph showing the X-axis position moved on the basis of the X-axis path table Tx shown in FIG. 18.

The above operation is the same as a conventional path table operation. However, in the present invention, regarding the portions of working where the same working is repeatedly performed during this path table operation, the positions of individual axes with respect to a reference position are stored as path cycle table. Then, in the positions where the same working is repeatedly performed, working is performed with the path cycle table which is read out from the path table. As a result, even if the same working is performed a number of times, the data to be stored can be data in just a single path cycle table, with the result that the amount of data is reduced so that only a small storage capacity is required in the storage means used.

Accordingly, the example of turning finishing cycle working shown in FIG. 2 will be described below as an example of working in this first embodiment.

The workpiece 7 is attached to the spindle by a chuck 9, and rotates together with the rotation of the spindle. After moving from the finishing cycle start position 0 to the first cut-in position A, the tool 8 moves from the position A to the position A1, from the position A1 to the position A2, from the position A2 to the position A3, from the position A3 to the position A4, and from the position A4 to the position A. Then, after moving to the second cut-in position B, the tool 8 performs working with the same working pattern as that described above. In other words, in the second working cycle, the respective positions A and A1 through A4 are shifted by an amount equal to the amount of shift from the position A to the position B, and the working from the position A to the position A1, the working from the position A1 to the position A2, the working from the position A2 to the position A3, the working from the position A3 to the position A4, and the working from the position A4 to the position A, are performed. Therefore, commanding the respective positions A1 through A4 with the cut-in position A as the origin, the same working can be performed by executing movements to the respective commanded positions A1 through A4 with the second cut-in position B taken as the origin. In the third working cycle as well, the same working can be performed by executing movements to the command positions A1 through A4 with the third cut-in position C taken as the origin.

If the same movement pattern is executed with different start positions, the same working is performed. Accordingly, working can be performed with commands of the same working pattern, by successively changing the cut-in position from A to B, and then to C.

Accordingly, the X-axis and Z-axis path tables Tx and Tz shown in FIGS. 3A and 3B, and the X-axis and Z-axis path cycle tables Txs and Tzs shown in FIGS. 4A and 4B, are prepared. Furthermore, the X-axis path table Tx (FIG. 3A) includes the X-axis path cycle tale Txs (FIG. 4A), and the Z-axis path table Tz (FIG. 3B) includes the Z-axis path cycle table Tzs (FIG. 4B).

In the X-axis path table Tx, the X-coordinate position X0 of the finishing cycle start position 0 is stored for the reference position L0, next, the X-coordinate position X1 of the first cut-in position A and the cycle call-up Q1000 is stored for the reference position L1, the X-coordinate position X2 of the second cut-in position B and the cycle call-up Q1000 is stored for the reference position L2, the X-coordinate position X3 of the third cut-in position C and the cycle call-up Q1000 is stored for the reference position L3, and the X-coordinate position X0 of the finishing cycle start position 0 is stored for the reference position L4.

Furthermore, in case where a table operation is performed prior to the finishing cycle start position and following the completion of the finishing cycle working, axial positions with reference to the reference positions as shown in FIG. 18 are set and stored in memory; however, since this has no direct connection with the present invention, only the tables for portions relating to working in which the same working is repeatedly performed are shown.

Meanwhile, in the X-axis path cycle table Txs that is called up by Q1000, as shown in FIG. 4A, the reference positions are stored as relative reference positions to the reference position at the start position of the same working, and the respective axial positions are relative positions to the start position of the same working and is stored for the reference positions. In other words, the reference position at the start position of the same working is taken as "0", and the positions X11 through X14 corresponding to the finishing cycle positions A1 through A4 when the cut-in positions A, B and C are taken as the origin "0" are set and stored in memory, with respect to the reference positions moved from this "0". In the example shown in FIG. 4A, the position X11 corresponding to the finishing cycle position A1 is set and stored in memory for the reference position L11, the position X12 corresponding to the finishing cycle position A2 is set and stored in memory for the reference position L12, the position X13 corresponding to the finishing cycle position A3 is set and stored in memory for the reference position L13, the position X14 corresponding to the finishing cycle position A4 is set and stored in memory for the reference position L14, and the position X15 corresponding to the finishing cycle start position A is set and stored in memory for the reference position L15.

As is shown in FIGS. 3B and 4B, the Z-axis path table Tz and Z-axis path cycle table Tzs for the Z axis are also similar to the abovementioned tables for the X axis. Here, however, the command that calls up the cycle table is Q1010, and when this command Q1010 is read out, the Z-axis path cycle table Tzs shown in FIG. 4B is executed and read out.

Figure 5:
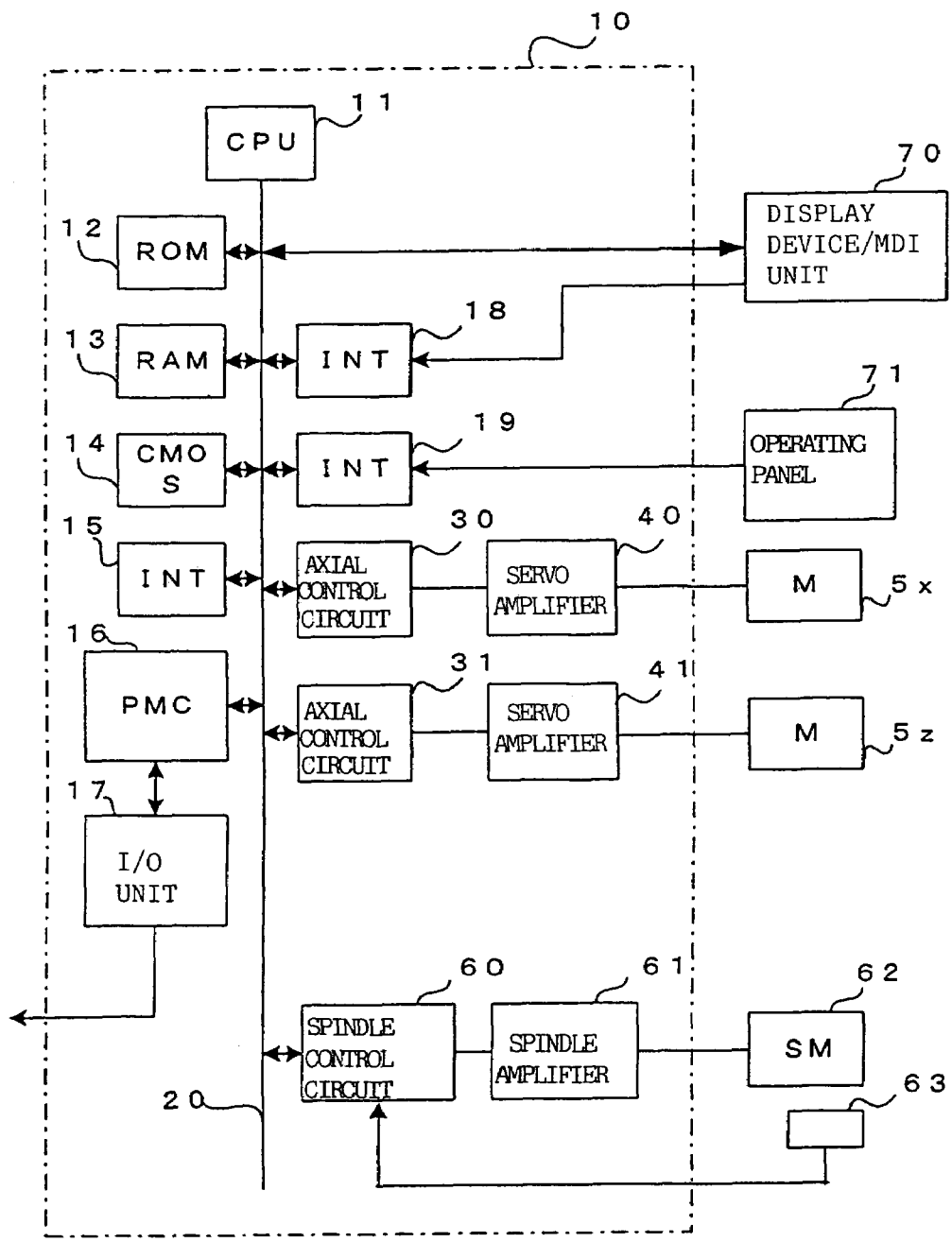
FIG. 5 is a block diagram of the essential parts of the numerical controller of the present invention.

FIG. 5 is a block diagram of the essential parts of one embodiment of a numerical controller 10 which drives machine tool using the path table operating function of the present invention. The CPU 11 is a processor which performs comprehensive control of the numerical controller 10. The CPU 11 reads out system programs stored in a ROM 12 via a bus 20, and controls the numerical controller as a whole in accordance with these system programs. Temporary calculation data, display data and various types of data input by the operator via the display device/MDI (manual data input) unit 70 are stored in a RAM 13. The CMOS memory 14 is backed up by a battery not shown in the figures, and is constructed as a nonvolatile memory in which a storage state is maintained even if the power supply of the numerical controller 10 is switched off. Working programs that are read in via the interface 15, working programs that are input by the operator via the display device/MDI unit 70, and the like, are stored in the CMOS memory 14. Furthermore, X-axis and Z-axis path tables Tx and Tz that include the abovementioned path cycle tables Txs and Tzs are stored beforehand in this CMOS memory 14.

The interface 15 allows connections between the numerical controller 10 and external devices. The PMC (programmable machine controller) 16 is a sequence program contained in the numerical controller 10; this PMC 16 outputs and controls signals to auxiliary devices of the machine tool via an I/O unit 17. Furthermore, this PMC 16 receives signals from various types of switches and the like on the operating panel disposed on the main body of the machine tool, performs the necessary signal processing, and then transfers the processed signals to the CPU 11.

The display device/MDI unit 70 is a manual data input device equipped with a display (constructed from a CRT, liquid crystal or the like), keyboard and the like; the interface 18 receives commands and data from the keyboard of the display device/MDI unit 70, and transfers these commands and data to the CPU 11. The interface 19 is connected to the operating panel 71, and receives various types of commands from the operating panel 71.

Axial control circuits 30 and 31 for the respective axes receive movement commands for the respective axes from the CPU 11, and output commands for the respective axes to servo amplifiers 40 and 41. The servo amplifiers 40 and 41 receive these commands, and drive servo motors 5*x* and 5*z* for the respective axes. The servo motors 5*x* and 5*z* for the respective axes have position/speed detectors, which feed back position and speed feedback signals to the axial control circuits 30 and 31 so that feedback control of the position and speed is performed. Furthermore, in FIG. 5, description about the position and speed feedback are omitted.

Furthermore, the spindle control circuit 60 receives spindle rotation commands, and outputs spindle speed signals to a spindle amplifier 61. The spindle amplifier 61 receives these spindle speed signals, and causes the spindle motor 62 that drives the spindle to rotate at the instructed rotational speed. The position detector 63 feeds back pulses (reference pulses) and single rotation pulses to the spindle control circuit 60 in synchronization with the rotation of the spindle, and thus performs speed control. These fed-back pulses and single rotation signals are read by the CPU 11 via the spindle control circuit 60, and the fed-back pulses (reference pulses) are counted by a counter (the counter 1 in FIG. 1) disposed in the RAM 13. Furthermore, the command pulses of the spindle may also be used as reference pulses.

Figure 6:
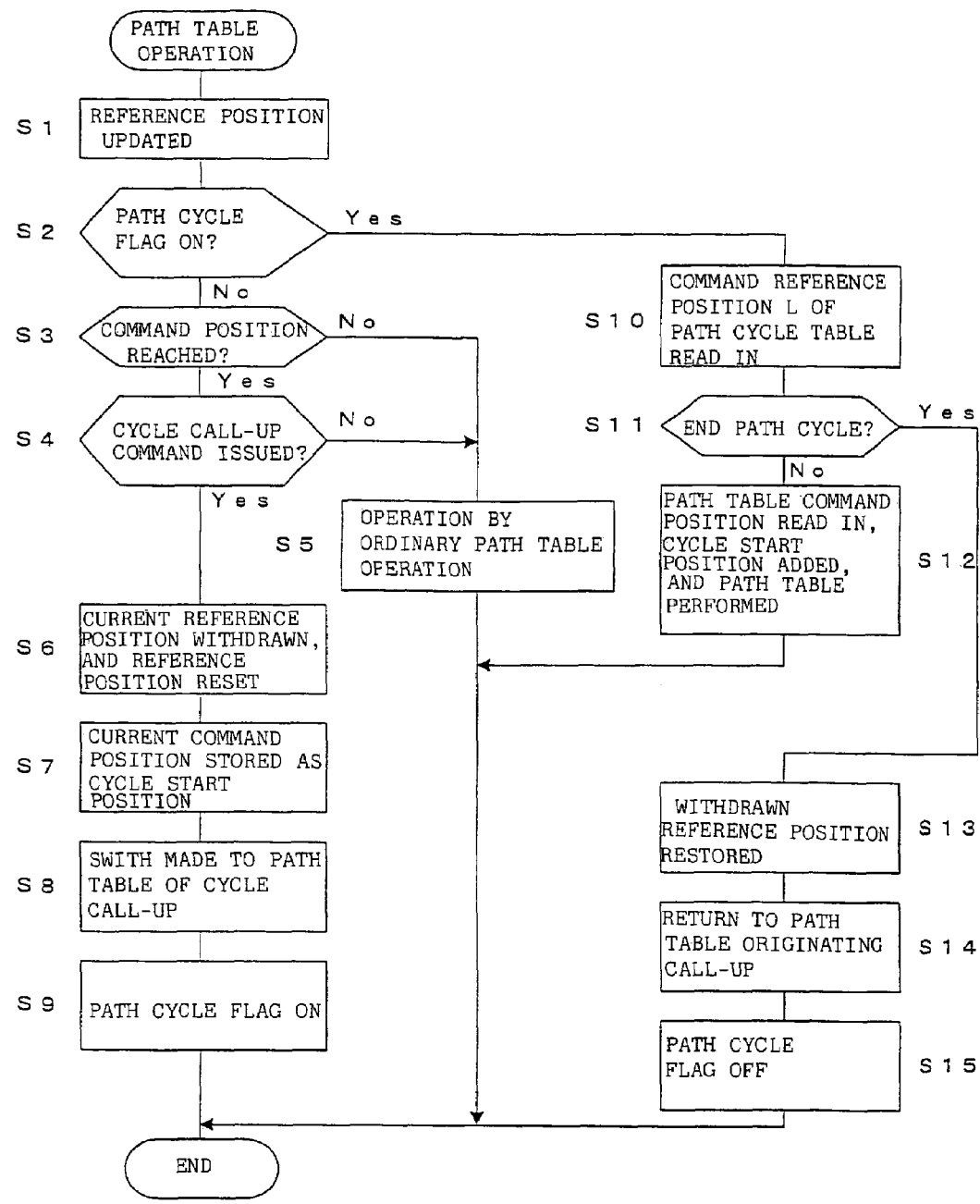
FIG. 6 is a flow chart showing the algorithm of the path table operation shown in FIG. 1.

FIG. 6 is a flow chart showing the processing algorithm that is executed by the CPU 11 of the numerical controller during the path table operation in this first embodiment.

The CPU 11 of the numerical controller executes the processing shown in FIG. 6 with a specified period.

First, the reference position L is updated (processing of the reference position counter 3 in FIG. 1). More specifically, in a register that stores the reference position L, the reference position is updated by adding a value multiplied by a specified override value to the count value of the counter 1 that counts fed-back pulses (or spindle command positions) from the position detector 63 that indicates the spindle position, or time reference pulses (step S1). Furthermore, in case where the spindle position is used as a reference position, since the fed-back pulses or command values from the position detector 63 that indicates the spindle position are pulses that are generated in a state in which these values have already been multiplied by the override value, this override value is taken as 1.

A judgment as to whether or not path cycle processing is in progress is made on the basis of a path cycle flag which is "on" during path cycle processing (step S2). If this flag is not "on", a judgment is made as to whether or not the current reference position L has reached the command reference position instructed by the path tables Tx and Tz (step S3), and if this current reference position has not reached the command reference position, an ordinary path table operation is executed (step S5). In case where the current reference position L has reached the command reference position, a judgment is made as to whether or not a cycle call-up command (Q1000 or Q1010) has been set for this command reference position (step S4). In case where a cycle call-up command has not been set and stored in memory, the ordinary path table operation of step S5 is executed; in this case, however, the next reference position larger than the current reference position stored in the path table is taken as the command reference position, and the X- and Z-axis positions stored in memory for this reference position are taken as the command positions.

Meanwhile, when the reference position L reaches the position L1 that is set and stored in the path table, and a cycle call-up command (Q1000 or Q1010) is read out in step S4, the CPU 11 withdraws the current reference position L (=L1) (i.e., stores this reference position in the register), and resets the reference position (i.e., resets the reference position counter 3 in FIG. 1) to "0" (step S6), so that the current X-axis and Z-axis positions (=X1 and Z1) are stored in the register as the cycle start positions (these start positions are called Xs and Zs) (step S7).

Furthermore, a switch is made to the path table of the cycle call-up command (Q1000 or Q1010) (step S8). As a result, for the X axis, since Q1000 is called up, there is a switch to the path cycle table Txs shown in FIG. 4A. Since Q1010 is called up for the Z axis, there is a switch to the path cycle table Tzs shown in FIG. 4B in this case. Then, the path cycle flag is switched "on" (step S9), and the processing for this period is ended.

In the next period, the processing of step S1 and step S2 is performed, and since it is detected in step S2 that the path cycle flag is "on", the processing proceeds to step S10, where a command reference position that is larger than the current reference position L, and that is the closest to the current reference position L, is read in from the switched path cycle table Txs or Tzs (step S10). Furthermore, in the present embodiment, the reference time or spindle position is taken to be a value in the direction of increase. Here, in case where there is no data to be read in (step S11), operation based on the path cycles tables Txs and Tzs is ended, and the processing proceeds to step S13. First, however, the command reference position L11 is read out, the positions X11 and Z11 set for this command reference position are read out, the cycle start positions stored in the register in step S7 (Xs and Zs; in the case of switching with the reference position L1, Xs=X1 and Zs=Z1) are added to these positions, and the end point of the path of the cycle operation is determined.

In the path cycle tables Txs and Tzs, the positions X11 through X15 and Z11 through Z15 on the respective axes are set and stored with the points of the path cycle start positions where the path cycle tables were called up taken as the origin. Accordingly, if the positions Xs and Zs on the X and Z axes that are stored in memory at the time that the path cycle is started are respectively added to these positions X11 through X15 and Z11 through Z15, the positions on the coordinate system used in this working control can be obtained.

Path table operation processing similar to that of a conventional system is performed on the basis of the positions (target positions) thus obtained, and movement commands for the current period are output to the respective axial control circuits 30 and 31 (step S12).

Subsequently, processing in steps S1, S2 and S10 through S12 are performed for each period, and path table operation processing is performed with the respective axial command positions relative to command reference positions that are larger than the current reference position L11 and that are close to this current reference position, taken as the target positions, and movement commands for the current period are determined so that the respective shaft motors 5*x* and 5*z* are driven.

The reference positions pass through L11, L12, L13, L14 and L15, the X axis moves (Xs+X11), (Xs+X12), (Xs+X13), (Xs+X14) and (Xs+X15), and the Z axis moves (Zs+Z11), (Zs+Z12), (Zs+Z13), (Zs+Z14) and (Zs+Z15). When the reference position L reaches the command reference position L15, and the next command reference position is read out, if it is judged that there is no command reference position to be read out (step S11), this means that the path cycle operation has ended. Accordingly, the processing proceeds to step S13, the reference position (initially L1) that was withdrawn in step S6 is restored (i.e., the reference position that was withdrawn by the reference position counter 3 shown in FIG. 1 is set) and returned to the path table that was the call-up source (step S14), and the path cycle flag is switched "off" (step S15).

Then, the processing returns to the path tables shown in FIGS. 3A and 3B, and the processing of steps S1 through S3 and step S5 is executed for each specified period. Then, when the reference position L reaches the next command reference position L2 stored in the path tables Tx and Tz, the cycle call-up command Q1000 or Q1010 is called up, the above-mentioned steps S6 through S9 are executed, the processing of the abovementioned steps S1, S2 and S10 through S12 is performed from the next period, and second cycle operation processing is performed on the basis of the path cycle tables Txs and Tzs shown in FIGS. 4A and 4B.

Subsequently, a third cycle operation is performed in the same manner; then, when the reference position L reaches the command reference position L4 stored in the path tables Tx and Tz, this finishing cycle working is ended.

Figures 7, 8A, 8B:
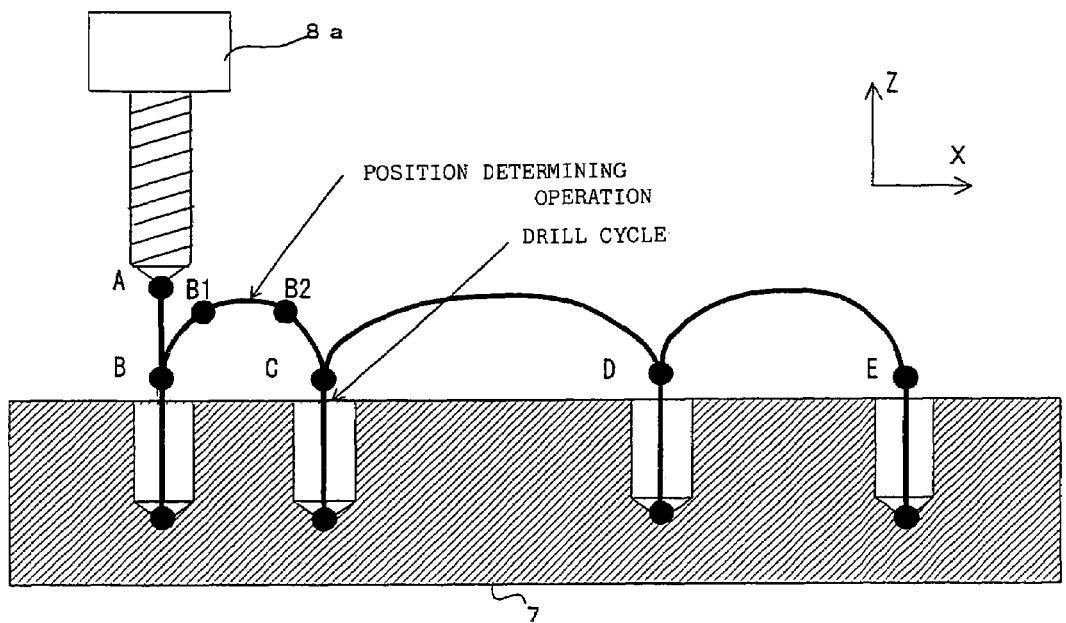
FIG. 7 is an explanatory diagram of drill cycle working performed by the path table operation shown in FIG. 1.
FIGS. 8A and 8B are explanatory diagrams of one example of a path table used for the drill cycle working shown in FIG. 7.

FIG. 7 is an explanatory diagram of one example of drill cycle working to which this first embodiment is applied.

Drill cycle working is a process in which drill hole working is performed in a plurality of locations on the workpiece 7 by means of a drill 8a. This drill hole working is performed in the same working cycle. In the example shown in FIG. 7, after the drill 8a is positioned in the drill cycle start position A, the drill 8a moves to the first hole working start position B, and drill hole working constituting the same working is initiated from this position. When the drill 8a returns to the start position B so that the drill hole working is completed, the drill 8a moves to the second drill hole working start position C via two intermediate points B1 and B2 en route to the next drill hole working position, and drill hole working is performed. Then, the drill 8a similarly advances to the start position D of the next drill hole working position via the instructed intermediate points, and subsequently advances even further to E, so that a plurality of drill holes are worked.

The working process from the initiation of working at the start position (B, C, D or E) of drill hole working to the return of the drill 8a to this start position is the same for each drill hole; accordingly, this portion of the working can be instructed using a path cycle table.

FIGS. 8A and 8B show examples of the X- and Z-axis path tables Tx and Tz in a case where this drill cycle working is performed. Furthermore, in case where working is performed by moving the drill in the direction of the Y axis (direction perpendicular to the X- and Z-axes) as well, a Y-axis path table that is similar to-the X-axis path table is used.

In the X-axis path table Tx, the X-coordinate position X0 of the drill cycle start position A is set and stored as a command position for the reference position L0. Next, the X-axis coordinate positions of the first cycle start position B and second cycle start position C are set and stored in memory as command positions X1 and X4 for the reference position L1 and L4, respectively, and cycle call-up command Q1020 to be used to call up the X-axis path cycle table Txs is designated for each of the reference positions L1 and L4. Similarly, for the third and fourth start positions D and E as well, the corresponding reference positions and coordinate positions are designated, and the cycle call-up command Q1020 is designated.

In the Z-axis path table Tz, the Z-coordinate position Z0 of the drill cycle start position A is set and stored as a command position for the reference position L0, and in the case of the reference position L1, the Z-axis coordinate position Z1 of the first cycle start position B is set and stored in memory, and a cycle call-up command Q1030 that is used to call up the Z-axis path cycle table Tzs is designated. Then, for the reference positions L2 and L3, Z-axis coordinate positions Z2 and Z3 corresponding to the intermediate positions B1 and B2 are set and stored in memory. Next, Z-axis coordinate position Z4 of the second cycle start position C is set and stored for the reference position L4, and the cycle call-up command Q1030 is designated. Although not shown in the figures, the respective cycle start positions D and E and their related intermediate positions are set and stored in the same repetitive way as described above.

Figures 9A, 9B, 10:
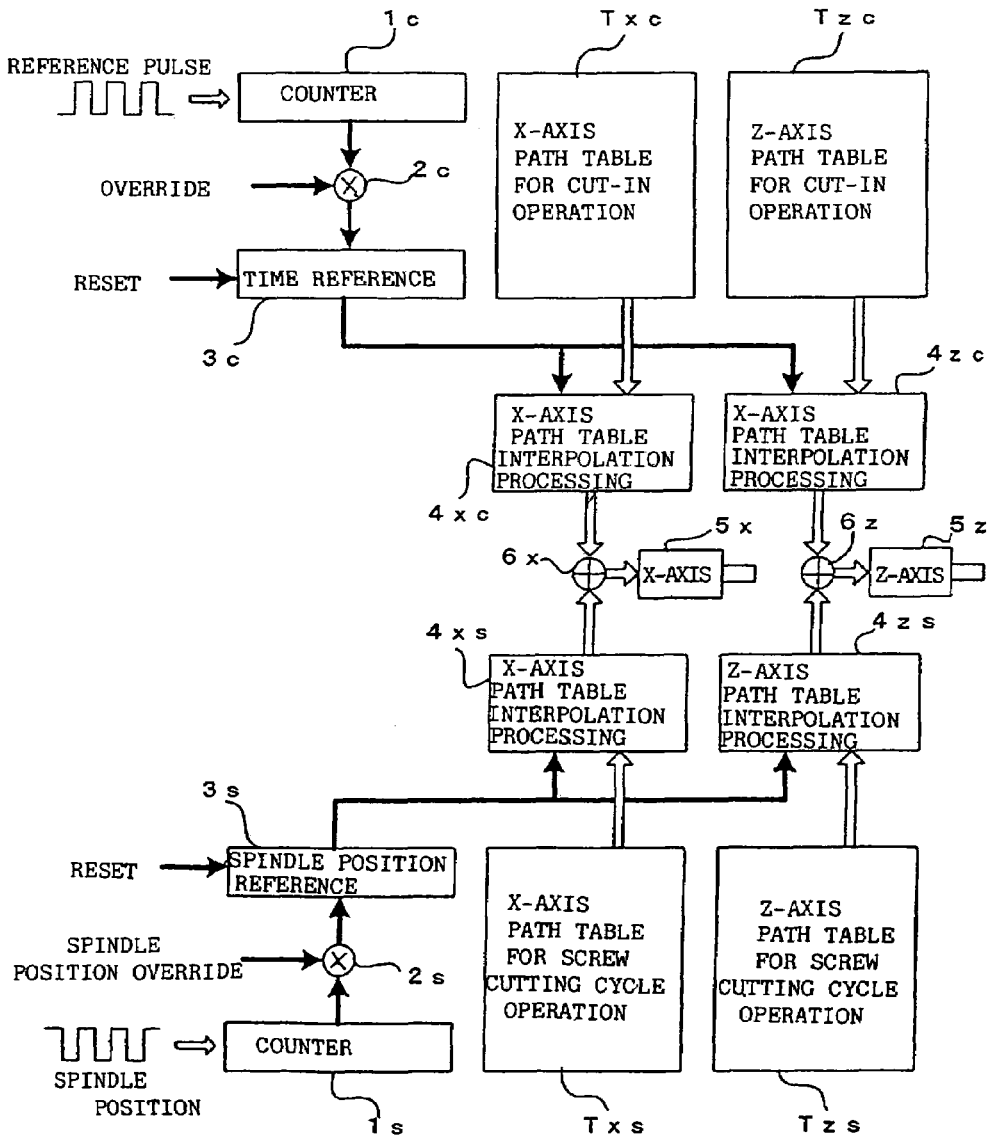
FIGS. 9A and 9B are explanatory diagrams of one example of a path cycle table used for the drill cycle working shown in FIG. 7.
FIG. 10 is a schematic diagram of a path table operation in which a second embodiment of the numerical controller of the present invention is worked.

FIGS. 9A and 9B show examples of path cycle tables in this drill cycle working. FIG. 9A shows an X-axis path cycle table Txs, and FIG. 9B shows a Z-axis path cycle table Tzs.

Figure 2:
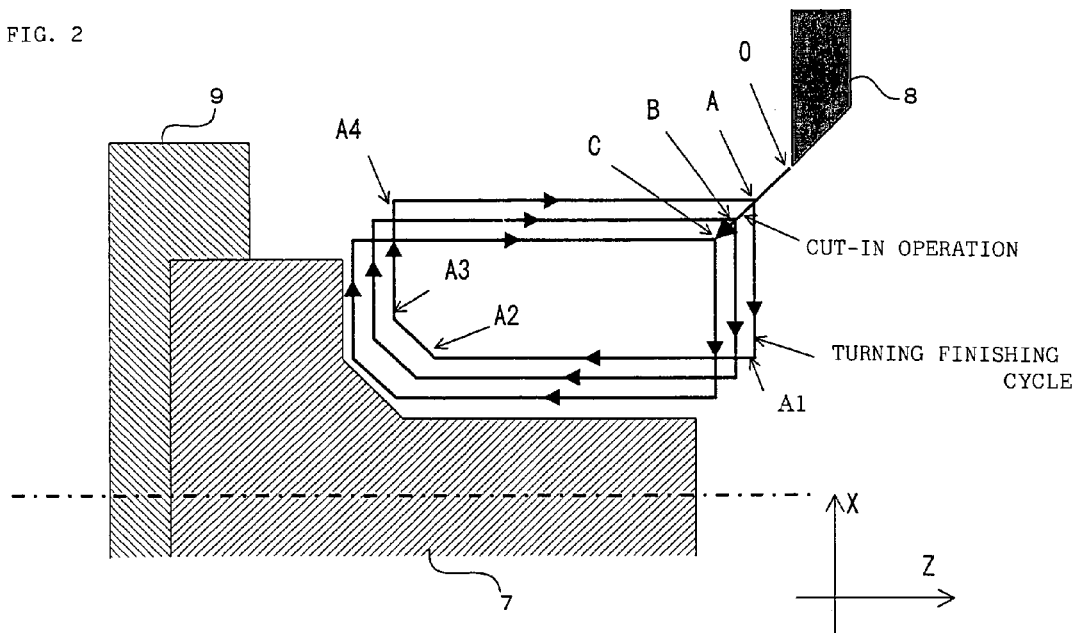
FIG. 2 is an explanatory diagram of turning finishing cycle working performed by the path table operation shown in FIG. 1.

In these path cycle tables Txs and Tzs, as in the example of turning finishing cycle working shown in FIG. 2 above, the reference position is reset to "0" when the start positions B, C, D and E of the cycle working are reached (when the cycle call-up command is read out), and the X- and Z-axis command positions are set and stored in these path cycle tables Txs and Tzs as positions in a case where these start positions B, C, D and E are taken as the origin "0".

First, the description will begin with the Z-axis path cycle table Tzs.

The drill hole working is initiated from the reference position 0, and the Z-axis positions Z11, Z12, Z13, Z14 and Z15 of the respective drill cycle operations are set and stored in memory for the reference positions L11, L12, L13, L14 and L15. Furthermore, the last position Z15 of each drill cycle operation is the start position (B, C, D or E), and is therefore "0".

Thus, in the drill hole working cycle, when the reference position reaches L15, the Z axis returns to the start position (B, C, D or E), and during this period, the X axis is in a state in which movement is stopped. Accordingly, "0" is set and stored for the reference position L15 in the X-axis path cycle table Txs.

A path table operation is executed by the numerical controller 10 using path tables Tx and Tz containing such path cycle tables Txs and Tzs. The flow chart of the processing operation performed by the CPU 11 in this case is the same as in the abovementioned example of turning finishing cycle working; only the path tables Tx and Tz are different. The operating processing of this drill cycle working will be briefly described with reference to FIG. 6.

For each specified period, as was described above, a judgment is made as to whether or not the reference position L has reached the position designated in the path tables Tx and Tz while this reference position is updated, and if this reference position has been reached, a judgment is made as to whether or not a cycle call-up command has been set and stored in memory. In case where the command position has not been reached, or in case where a cycle call-up command has not been set and stored in memory even though the command position has been reached, an ordinary path cycle operation is performed (steps S1 through S5).

Then, when the reference position reaches L1, and the cycle call-up commands Q1020 and Q1030 are read out from the X- and Z-axis path tables Tx and Tz in correspondence with this reference position, the current reference position (L1) is withdrawn, the reference position is reset, the current command positions (X-axis and Z-axis positions (Xs and Zs) of the start position B, C, D or E) are stored in memory, a switch is made to the path cycle tables Txs and Tzs, and the path cycle flag is switched "on".

From the next period, the processing proceeds from step S2 to step S10, and the command positions that are set for the next command reference positions and that are larger than the current reference positions L are read. First of all, a command position 0 for L15 is read in from the X-axis path cycle table Txs, and a command position Z11 for the reference position L11 is read in from the Z-axis path cycle table Tzs. The cycle start positions (Xs, Zs) that are stored in memory are added to these read-in positions, the target positions are determined, and a path table operation is executed in the same manner as in a conventional system (steps S10 through S12). Furthermore, since the command position for the X axis is 0, this axis does not move.

Subsequently, the reference position L is updated, and each time that this reference position L reaches a command reference position (L12, L13, L14, L15) that is set in the Z-axis path cycle table Tzs, a path table operation is performed with the command position in this case taken as the target position (Z12, Z13, Z14, Z15). When the reference positions that are to be read out from the path cycle tables Txs and Tzs are exhausted, the processing based on these path cycle tables is ended, the withdrawn reference position is restored and returned to the original path table, and the path cycle flag is switched "off" (steps S13 through S15). As a result, a path table operation based on the path tables Tx and Tz shown in FIGS. 8A and 8B is performed beginning with the next period.

The reference positions and respective axial positions stored in the path cycle tables Txs and Tzs are reference positions at the time that the path cycle of the same working is initiated, relative reference positions to the respective axial positions, and relative positions of the respective axes; accordingly, a method may be used which allows the designation of reference positions at the time that the path cycle of the same working is initiated and relative positions to the respective axial positions.

Consequently, in the abovementioned embodiment, the reference position at which the reference position was withdrawn and reset and the operation based on the path cycle tables Txs and Tzs was initiated in step S6 was set as "0". However, instead of this processing, it would also be possible in step S6 to store the reference position at this time in memory as the path cycle start reference position, and to compare a value obtained by subtracting this path cycle start reference position from the reference position, with the command reference positions set and stored in the path cycle tables Txs and Tzs, in step 10.

Furthermore, in the abovementioned embodiment, in the path cycle tables Txs and Tzs (FIGS. 4A and 4B and FIGS. 9A and 9B), the command reference positions are given as positions (absolute positions) in which the cycle start position is taken as the origin 0; however, these points may also be set as incremental values. Specifically, these points may be set as amounts of movement. In this case, a register may be prepared, and the system may be devised so that command reference positions are successively added to this register so that absolute positions are determined and compared with the reference positions.

Furthermore, in the example of the embodiment described above, the respective command positions in the path cycle tables Txs and Tzs (FIGS. 4A and 4B and FIGS. 9A and 9B) are also positions set and stored in memory using coordinate positions in which the cycle start positions are taken as the origin 0. However, these command positions may also be commanded using incremental amounts. In this case, the system may be devised so that the current command position is stored in a register as a cycle start position in step S7, the incremental amounts of the respective command positions are successively added to this register, and absolute positions are determined. Furthermore, in case where a path table operation is performed on the basis of these path cycle tables Txs and Tzs, the system may be devised so that the system is operated on the basis of incremental amounts.

FIG. 10 is a schematic diagram of operating functions based on tabular format data in a second embodiment of the present invention. This embodiment differs from the first embodiment shown in FIG. 1 in that two driving control systems based on tabular format data are installed. This embodiment shows an example of working in which screw cutting working is performed using tabular format data.

An X-axis path table Txc and Z-axis path table Tzc for cut-in operation are stored in the memory; furthermore, an X-axis path table Txs and Z-axis path table Tzs for screw cutting cycle operation are also stored in the memory. Furthermore, X-axis and Z-axis path table interpolation processing parts $4xc$ and $4zc$ for the cut-in operation, and X-axis and Z-axis path table interpolation processing parts $4xs$ and $4zs$ for the cutting cycle operation, are also provided.

Furthermore, in this second embodiment, the cut-in operation is performed using time as a reference, and the cutting cycle operation is performed using the spindle position as a reference. Accordingly, pulses using time as a reference are input into a counter $1c$ installed on the side of the cut-in operation, the count value of this counter $1c$ is multiplied with a time override by a multiplier $2c$ in override means, and the result is input into a time reference counter $3c$ which outputs a time reference.

The reference time that is the value of the time reference counter $3c$ is input into the X- and Z-axis path table operation interpolation processing parts $4xc$ and $4zc$ for each specified period, the command positions of the respective control axes with respect to the reference time are determined with reference to the respective path tables Txc and Tzc for cut-in operation stored in the memory, and the differences between these determined command positions and the command positions in the previous period are output to adders $6x$ and $6z$ as movement commands.

Meanwhile, in the screw cutting cycle operation, the start position of the screw cutting is made the same each time by actuation with a path table command that ends at an integral multiple of 360 degrees. As a result, there is no need to achieve synchronization with the rotational position of the spindle. Signals that indicate the position of the spindle such as pulses from a position detector attached to the spindle, command pulses of the spindle or the like, are input into a counter $1s$, the value of this counter is multiplied in a multiplier $2s$ by an override value provided by spindle position override means, and the result is input into a spindle position reference counter $3s$ as the reference spindle position, for each specified period.

Then, for each specified period, the reference spindle position indicated by the spindle position reference counter $3s$ is input into the path table operation interpolation processing parts $4xs$ and $4zs$ for the X- and Z-axis screw cutting cycle operations, the command positions of the respective control axes with respect to the reference spindle position are determined by referring to the path tables Txs and Tzs for the respective screw cutting cycle operations that are stored in the memory, and the differences between these determined command positions and the command positions in the previous period are output to the adders $6x$ and $6z$ as movement commands.

In the adder $6x$, the movement commands that are output from the respective path table operation interpolation processing parts $4xc$ and $4xs$ for the X-axis cut-in operation and screw cutting cycle operation are added, and the X-axis servo motor $5x$ is driven. Similarly, in the adder $6z$, the movement commands that are output from the respective path table operation interpolation processing parts $4zc$ and $4zs$ for the Z-axis cut-in operation and screw cutting cycle operation are added, and the Z-axis servo motor 5z is driven on the basis of the added values.

Furthermore, the time reference counter 3c is reset at the point in time at which a command is given for the path table operation function, and the spindle position reference counter 3s is also reset at the point in time at which a command is given for the path table operation function. This time reference counter 3c and spindle position reference counter 3s are altered according to the enlargement factor of the override means; for example, if the override value spindle position is taken as 1, then the reference spindle position indicated by the spindle position reference counter 3s indicates the rotational position of the spindle.

Figures 11, 12, 13:
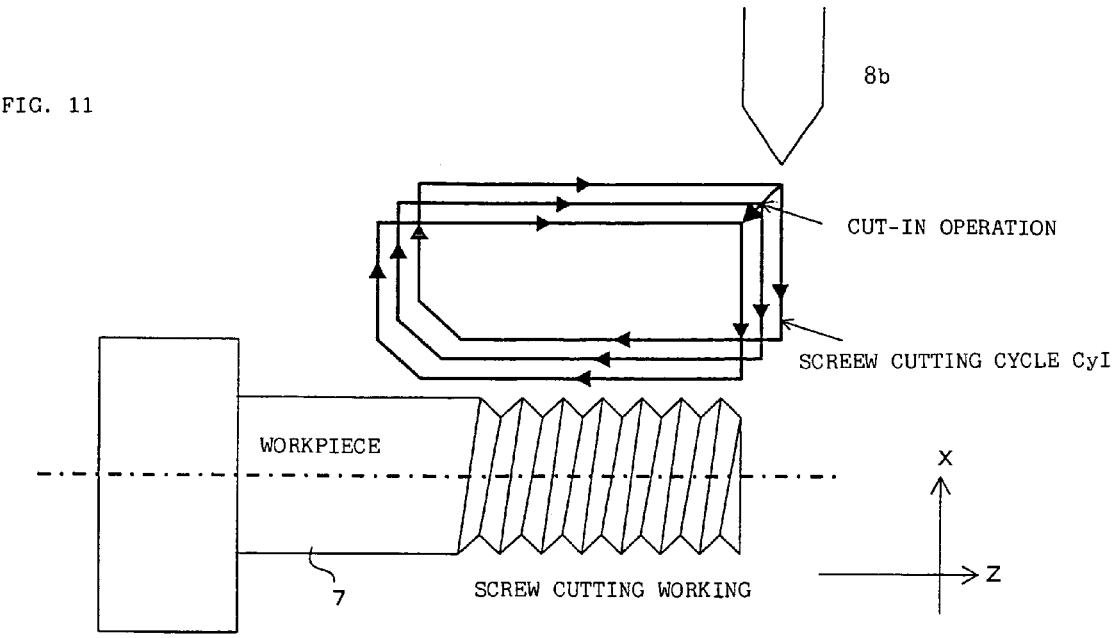
FIG. 11 is an explanatory diagram of one example of screw cutting working performed by the path table operation shown in FIG. 10.
FIG. 12 is an explanatory diagram of a path table used for the X-axis cut-in operation in the screw cutting cycle working shown in FIG. 11.
FIG. 13 is an explanatory diagram of one example of a path table used for the screw cutting cycle operation in the screw cutting cycle working shown in FIG. 11.

FIG. 11 is an explanatory diagram of one example of screw cutting working performed in this embodiment. The workpiece 7 is attached to the spindle of the machine tool, and is caused to rotate. Furthermore, the screw cutting tool 8b can move in relative terms along the X axis (direction perpendicular to the axial line of the spindle (center axial line of the workpiece)) and Z axis (direction of the axial line of the spindle (center axial line of the workpiece)) with respect to the workpiece 7, and performs a fixed screw cutting cycle Cyl a multiple number of times while performing a specified amount of cutting-in, so that a screw shape is worked in the workpiece 7.

Cut-in operation path tables of the type shown in FIG. 12 are provided for the position of the screw cutting tool 8b relative to the workpiece 7 in the cut-in operation performed in this screw cutting working. An example of an X-axis path table Txc for cut-in operation is shown in FIG. 12; however, a Z-axis path table Tzc for cut-in operation may also be similarly provided.

In FIG. 12, the "time" indicates the reference time that is output from the time reference counter 3c, and the positions corresponding to respective reference times indicate the cut-in position. In this FIG. 12, an example in which a screw is worked by performing a cut-in operation four times is shown. In the position corresponding to a reference time of L4 after this cut-in operation has been performed four times, a screw cutting working "end" command is stored in memory. This working process is devised so that a cut-in operation at a cut-in position X3 which is the same as the final cut-in position X3 is subsequently performed at the reference time L5, and finishing working is performed.

FIG. 13 is an explanatory diagram of an example of a path table for a screw cutting cycle operation. The amount of movement of each path in a screw cutting cycle Cyl (i.e., the amount of relative movement of the screw cutting tool 8b with respect to the workpiece 7) is stored in memory in correspondence with the reference spindle position. In other words, the path movement amount is stored in memory as an incremental amount U in correspondence with the reference spindle position that is output from the spindle position reference counter 3s. Furthermore, in FIG. 13, an example is shown in which the X- and Z-axis path tables Txs and Tzs for screw cutting cycle operations are constructed as a single table. In this FIG. 13, the screw cutting cycle is composed of five paths, and screw cutting cycle "end" command is stored in memory such that this screw cutting cycle is ended when the reference spindle position reaches S5.

Figure 14:
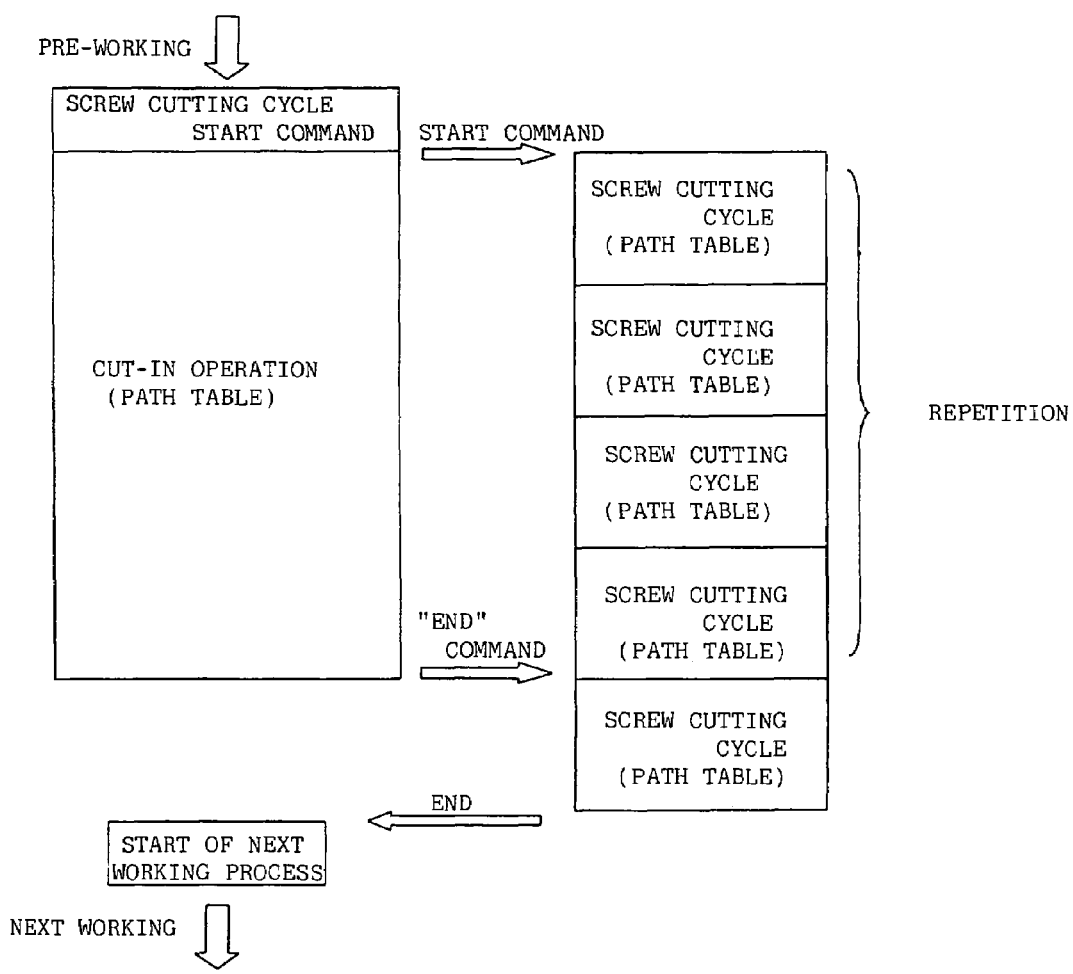
FIG. 14 is a diagram which illustrates an operating outline of the path table operation shown in FIG. 10.

FIG. 14 is an explanatory diagram illustrating an outline of the operation in this embodiment. When a screw cutting cycle start command is given following the completion of preworking that is performed prior to this screw cutting working, so that screw cutting working is initiated, a cut-in operation is performed on the basis of the X- and Z-axis path tables Txt and Tzc cut-in operation; furthermore, a screw cutting cycle is performed a multiple number of times (four times in this example) on the basis of X- and Z-axis path tables Txs and Tzs for screw cutting cycle operation. Then, the screw cutting working is ended, and a single finishing working screw cutting cycle is subsequently performed, after which the working proceeds to the next working operation.

Figure 15:
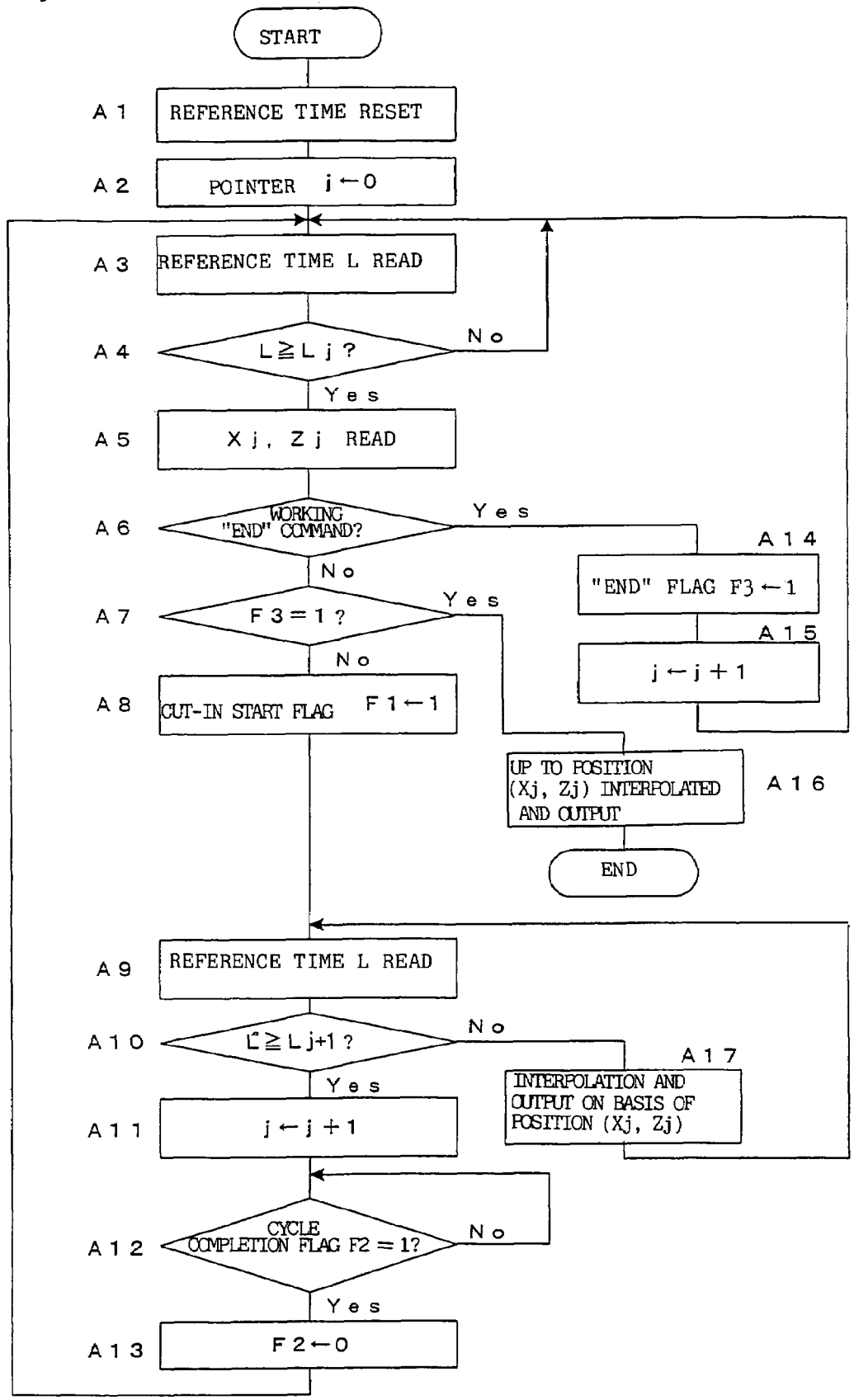
FIG. 15 is a flow chart showing the algorithm of the processing of the cut-in operation in the screw cutting cycle working shown in FIG. 11.
Figure 16:
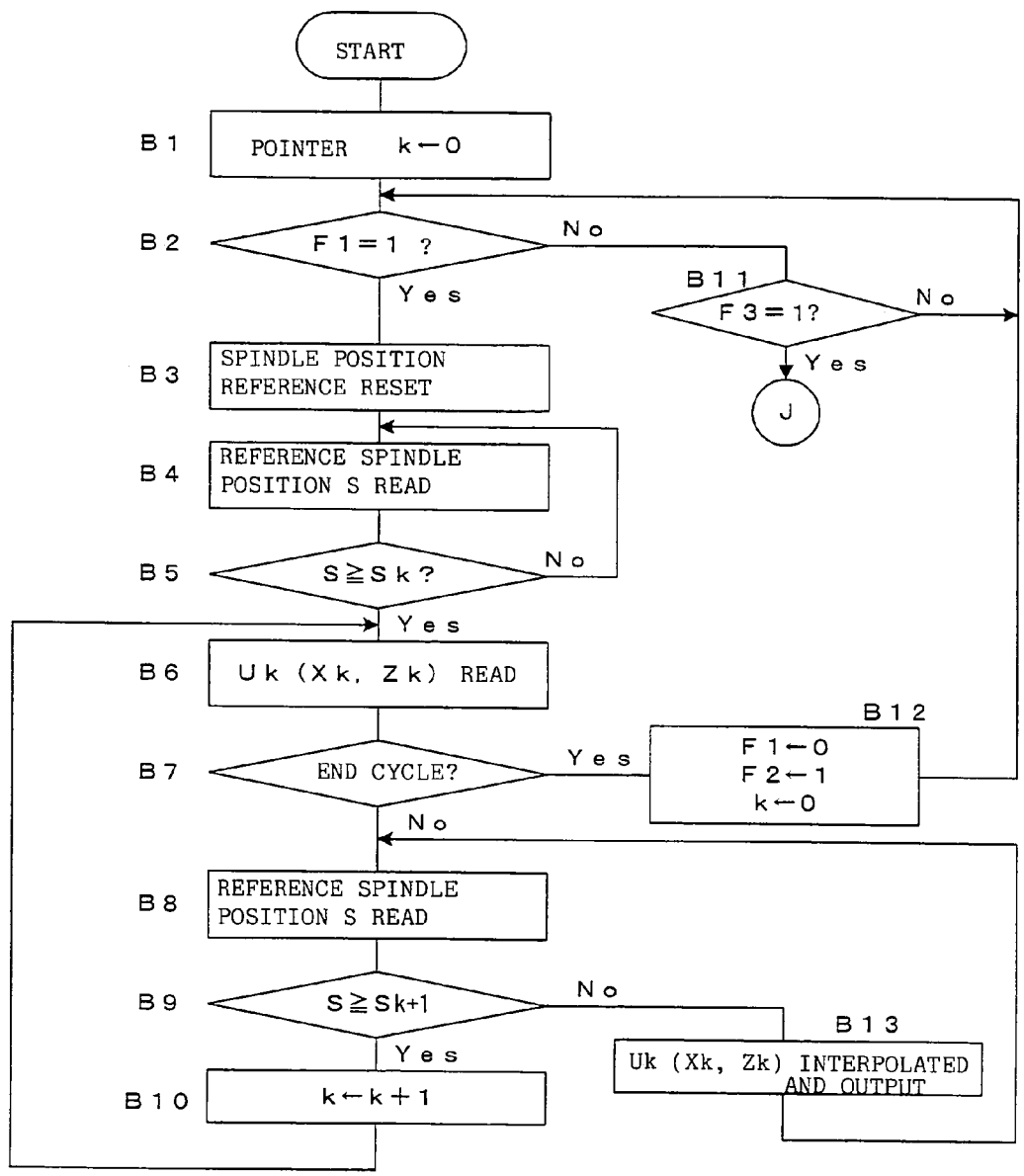
FIG. 16 is a flow chart showing the algorithm of the processing of screw cutting cycle operation in the screw cutting cycle working shown in FIG. 11.

FIGS. 15, 16 and 17 are flow charts showing the algorithm of the processing that is performed for each specified period by the CPU 11 of the numerical controller 10 shown in FIG. 5 when a cutting cycle start command based on tabular format data is issued. FIG. 15 shows the processing of the cut-in operation, and FIGS. 16 and 17 show the processing of the screw cutting cycle.

When a screw cutting cycle start command is issued, the CPU 11 resets the reference time counter 3c that is determined by the reference pulses and override value (step A1), and then resets the pointer j to "0" (step A2), and reads the reference time L which is the count value of the reference time counter 3c (step A3). A judgment is made as to whether or not this reference time L has reached the time Lj corresponding to the pointer j that is stored in the path tables Txc and Tzc for cut-in operation (step A4), and the processing of step A3 and step A4 is repeated until the reference time L reaches this time Lj. When the time Lj is reached, the positions Xj and Zj that are set for this time Lj are read out from the path tables Txc and Tzc for cut-in operation (step A5).

Next, a judgment is made as to whether or not the read-out data is a working "end" command (step A6), and in case where this data is position data, not a working "end" command, a judgment is made as to whether or not the "end" flag F3 is "1" (step A7), and if this flag F3 is not "1" (the flags F1 and F2 which will be described later along with this flag F3 are set to "0" with initial settings at the time that the power supply is switched on, the cut-in start flag F1 is set to "1" (step A8), and the reference time L is read out (step A9). A judgment is made as to whether or not this reference time L has reached the time Lj+1 which is stored in the path tables Txc and Tzc for cut-in operation (step A10), and if this time Lj+1 has not been reached, interpolation processing is performed on the basis of the cut-in amounts for the reference times Li and Lj+1 and positions Xj and Zj, the movement amounts for the current period are output to the X- and Z-axis axial control circuits 30 and 31 (step A17), and the processing returns to step A9. Subsequently, the processing of steps A9, A10 and A17 is performed until the reference time L reaches the time Lj, interpolation processing is performed up to the positions Xi and Zj, and the movement amounts are output.

When the reference time L reaches the time Lj+1, the pointer j is increased by "1" (step A11), and the processing waits until the screw cutting cycle completion flag F2 is set to "1" (step A12). Then, when the screw cutting cycle completion flag F2 is set to "1", the screw cutting cycle completion flag F2 is set to "0"(step A13), the processing returns to step A3, and the processing from the abovementioned step A3 on is performed.

Meanwhile, in the processing of the screw cutting cycle shown in FIG. 16, when a screw cutting cycle start command is issued, the CPU 11 sets the pointer k to "0" (step B1), and judges whether or not the cut-in start flag F1 is "1", and whether or not the working "end" flag F3 is "1" (steps B2 and B11). When the cut-in start flag F1 is set to "1" in step A8 of the cut-in processing, the CPU 11 detects this, and resets the spindle position reference counter 3s determined by the feedback pulse from the position detector 63 or the command pulse and override value of the spindle (step B3).

Next, the reference spindle position S indicated by the spindle position reference counter 3s is read out (step B4), a judgment is made as to whether or not this reference spindle position S has reached the spindle position Sk corresponding to the pointer k stored in the path tables Txs and Tzs for screw cutting cycle (step B5), and the processing of these steps B4 and B5 is repeated until the reference spindle position S reaches this position Sk. When the spindle position Sk is reached, the movement amount Uk (Xk, Zk) set for this spindle position Sk is read out from the path tables Txc and Tzc for screw cutting cycle (step B6). Then, a judgment is made as to whether or not the read-out data is a cycle "end" command (step B7) In case where this data is movement amount data and not a cycle "end" command, the reference spindle position S indicated by the spindle position reference counter 3s is read out (step B8). Then, a judgment is made as to whether or not the reference spindle position S has reached the spindle position Sk+1 that is stored next in the path tables Txs and Tzs for screw cutting cycle (step B9), and if the spindle position Sk+1 has not been reached, interpolation processing is performed on the basis of the spindle positions Sk and Sk+1 and the read-out movement amount Uk (Xk, Zk), and the result is output to the X- and Z-axis axial control circuits 30 and 31 (step B13). Subsequently, the processing of steps B8, B9 and B13 is performed in each period until the reference spindle position S reaches the spindle position Sk+1 that is stored next.

Furthermore, for each period, the X- and Z-axis axial control circuits 30 and 31 add the movement amounts output in the cut-in processing and the movement amounts output in the cutting cycle processing, and drive the respective servo motors 5x and 5z.

When the reference spindle position S reaches the spindle position Sk+1 that is stored next, the pointer k is increased by "1" (step B10), the processing returns to step B6, and the processing in step B6 and subsequent steps is performed. Thus, as the spindle rotates, the paths U0, U1, U2, U3 and U4 of the relative movement of the screw cutting tool 8b with respect to the workpiece 7 are performed in accordance with the tabular data shown in FIG. 13 so that the working of a single screw cutting cycle is completed. Then, when it is judged in step B6 that the read-out data is a cycle "end" command, the cut-in start flag F1 is set to "0", and the screw cutting cycle completion flag F2 is set to "1", furthermore, the pointer k is set to "0" (software execution control program B12), and the processing returns to step B2.

As a result of the screw cutting cycle completion flag F2 being set to "1", it is detected in step A12 in the cut-in processing that this flag F2 has been set to "1"; then, this flag F2 is set to "0" (step A13), and the processing in step A3 and following steps are performed so that the next cut-in is performed.

Thus, in this embodiment, cut-in is performed four times as indicated in the path table Txc shown in FIG. 12, and the screw cutting cycle shown in FIG. 13 is performed four times. Subsequently, in the cut-in processing, it is detected in the processing of step A4 that the reference time L has reached the time L4 stored in the X- and Z-axis tables Txc and Tzc for cut-in operation, and a screw cutting working "end" command is read out from these path tables Txc and Tzc, so that the processing shifts from step A6 to step A14. Then, the "end" flag F3 is set to "1", the pointer j is increased by "1" (step A15), the processing returns to step A3, and the processing in step A3 and following steps are performed. Specifically, the reference time L is read, this reference time L is monitored, and the system waits until this reference time L reaches the time Lj (=L5) corresponding to the pointer j (=5) stored in the path tables Txc and Tzc for cut-in operation (steps A3 and A4). When the time Lj is reached, the positions Xj (=X5) and Zj (=Z5) set for this time Lj (=L5) are read out from the path tables Txc and Tzc for cut-in operation (step A5). In this case, the same cut-in position as that used in the previous cycle working is set.

A judgment is made as to whether or not the read-out data is a working "end" command (step A6), and since this data is not a working "end" command, a judgment is made as to whether or not the "end" flag F3 is "1" (step A7). In this case, since this flag was set to "1" in step A14, the processing shifts to step A16, and interpolation processing up to the positions Xj (=X5) and Zj (=Z5) is performed in each period. The results are output to the X- and Z-axis axial control circuits 30 and 31 (step A16), the distribution of movement commands up to the positions Xj (=X5) and Zj (=Z5) is completed, and this processing is ended.

In the screw cutting cycle processing, after the screw cutting cycle is ended, the processing of steps B2 and B11 is repeated. In step B11, when it is detected that the "end" flag F3 has been set to "1", the reference spindle position S indicated by the spindle position reference counter 3s is read out (step B14). A judgment is made as to whether or not this reference spindle position S has reached the spindle position Sk corresponding to the pointer k stored in the path tables Txs and Tzs for screw cutting cycle (step B15), and the processing of these steps B14 and B15 is repeated until the position Sk is reached. When the position Sk is reached, the movement amounts (Xk, Zk) set for this spindle position Sk are read out from the path tables Txc and Tzc for screw cutting cycle (step B16), and a judgment is made as to whether or not the read-out data is a cycle "end" command (step B17). If this data is movement amount data and not a cycle "end" command, the reference spindle position S indicated by the spindle position reference counter 3s is read out (step B18), and a judgment is made as to whether or not this reference spindle position S has reached the spindle position Sk+1 that is stored next in the path tables Txs and Tzs for screw cutting cycle (step B19). If the position Sk+1 has not been reached, the read-out movement amount Uk (Xk, Zk) is interpolated, and the results are output to the X- and Z-axis axial control circuits 30 and 31 (step B22). Subsequently, the processing of steps B18, B19 and B22 is repeated until the reference spindle position S reaches the spindle position Sk+1 that is stored next.

Furthermore, the X- and Z-axis axial control circuits 30 and 31 add the amounts of movement that are output in the cut-in processing and the amounts of movement that are output in the screw cutting cycle processing, and drive the respective servo motors 5x and 5z.

When the reference spindle position S reaches the spindle position Sk+1 that is stored next, the pointer k is increased by an increment of "1" (step B20), the processing returns to step B16, the next movement commands are read out from the path tables Txc and Tzc for screw cutting cycle, and the processing in step B16 and following steps are successively performed. Then, when an "end" command is read out for the screw cutting cycle working, the processing proceeds from step B17 to step B21, the flags F1 through F3 are set to "0", and this screw cutting working processing is ended. Furthermore, in this embodiment, the system is devised so that a single screw cutting cycle is performed in the same final cut-in amount as finishing working; however, this finishing working may also be performed a multiple number of times.

In the abovementioned second embodiment, tabular data for cut-in operation is prepared using time as reference so that cut-in operation is performed using time as a reference. The reason why time is used as a reference in this case is due to the fact that, in the working to be performed prior to this screw cutting working or the like, the driving of the respective axes is controlled, in many cases, by means of tabular format data using time as reference. However, in this cut-in operation as well, it is also be possible to prepare tabular data using the spindle position as a reference, and to operate using a spindle position as a reference. Since such a cut-in is performed at the beginning of the screw cutting working and each time that the screw cutting cycle is completed, cut-in operation may be performed at the initial start of working, and every time the screw cutting cycle "end" signal is issued.

On the other hand, the screw cutting cycle operation is performed using spindle position as a reference. The reason why spindle position is used as a reference in this case is due to the fact that screw cutting cycle is concerned with a rotational position of the workpiece 7 attached to the spindle. However, in case where there is an accurate correspondence between the spindle position and time, it would also be possible to use time as a reference, instead of this spindle position.

What is claimed is:

1. A numerical controller that is capable of driving respective axes by commanding respective axial positions with respect to reference positions in which time or spindle position is used as reference, as data in a tabular format, comprising:

storage means that has a path table for storing respective axial positions with respect to the reference positions, and a path cycle table storing, as tabular format data, respective axial positions with respect to the reference positions, from a working start position to a working end position of the same working that is repeatedly performed;

first calculating means for calculating amounts of movement of the respective axes on the basis of said path table;

second calculating means for calculating the amounts of movement of the respective axes on the basis of the data in said path cycle table; and driving means for adding the amounts of movement of the respective axes for operations calculated by said first and second calculating means and outputting the added amounts of movement to respective axial motors to perform driving the respective axes, wherein the reference positions of the path table that stores the respective axial positions are data using time as a reference, and the reference positions of the path cycle table are data using positions on a spindle axis as a reference.

* * * * *

UNITED STATES PATENT AND TRADEMARK OFFICE
CERTIFICATE OF CORRECTION

PATENT NO. : 7,580,770 B2
APPLICATION NO. : 11/395268
DATED : August 25, 2009
INVENTOR(S) : Takahiko Endo et al.

It is certified that error appears in the above-identified patent and that said Letters Patent is hereby corrected as shown below:

Page 2, Column 1 (Other Publications), Line 5, change "SIMTECT" to --SIMTECH--.

Sheet 4 of 12, Box S8, FIG. 6, Line 1, change "SWITH" to --SWITCH--.

Sheet 7 of 12, FIG. 11, Line 3, change "SCREEW" to --SCREW--.

Sheet 7 of 12, FIG. 11, Line 3, change "CyI" to --Cyl--.

Column 2, Line 33, change "respective-axial" to --respective axial--.

Column 9, Line 44, change "to-the" to --to the--.

Column 13, Line 67, change "Txt" to --Txc--.

Column 15, Line 13, change "(step B7) In" to --(step B7). In--.

Column 18, Line 11, before "amounts" delete "the".

Signed and Sealed this

Seventeenth Day of November, 2009

David J. Kappos
*Director of the United States Patent and Trademark Office*

Txc

| TIME | POSITION |
|---|---|
| L0 | X0 |
| L1 | X1 |
| L2 | X2 |
| L3 | X3 |
| L4 | SCREW CUTTING WORKING "END" COMMAND |
| L5 | X3 |

Txs, Tzs

| SPINDLE POSITION | POSITION |
|---|---|
| S0 | U0 (x0, z0) |
| S1 | U1 (x1, z1) |
| S2 | U2 (x2, z2) |
| S3 | U3 (x3, z3) |
| S4 | U4 (x4, z4) |
| S5 | SCREW CUTTING CYCLE "END" COMMAND |

(U1/U2/U3/U4: INCREMENTAL COMMANDS)